July 30, 1957  M. B. PICKOVER  2,801,381

FREQUENCY REGULATOR

Filed Dec. 13, 1954

INVENTOR.
MERWIN B. PICKOVER
BY
ATTORNEY

United States Patent Office 2,801,381
Patented July 30, 1957

2,801,381

FREQUENCY REGULATOR

Merwin B. Pickover, Red Bank, N. J., assignor to Bendix Aviation Corporation, Eatontown, N. J., a corporation of Delaware Application December 13, 1954, Serial No. 474,721

5 Claims. (Cl. 322—32)

The present invention relates to a regulator system for dynamoelectric machines and more particularly to a regulator system for use with an inverter.

In some applications it is desirable to hold the output frequency of an inverter within close limits over varied output conditions. Heretofore, changes in the output frequency have been sensed by a parallel resonant circuit tuned to resonance slightly below the operating frequency in order that the energization of the frequency control operates on the slope of the resonance curve. In order to maintain accurate frequency regulation it is necessary that the tuned circuit have a high "Q" and thereby a steep slope in the resonance curve. However, at speeds below the operating range, which are encountered in starting and stopping, high voltages and, therefore, high currents will be present in the regulating system. Since the magnitude of these voltages and currents are many times those encountered during normal operating conditions, larger rectifiers and higher rated condensers would be required. Also, other circuit components would have to be designed for the abnormal conditions.

The present invention provides a series resonant circuit which employs a high "Q" and utilizes a resistor in series therewith to limit the peak voltages and currents. In other words the resonant curve will have a steep slope and thereby the desired sensitivity, yet the peak will be limited to safe values.

It is an object of the invention to provide an improved regulating system for a dynamoelectric machine.

Another object of the invention is to provide a novel frequency regulating system for a dynamoelectric machine.

Another object of the invention is to provide means for preventing high voltages and currents in the regulating control circuit.

The above and other objects and features of the invention will appear more fully hereinafter from a consideration of the following description taken in connection with the accompanying drawing wherein one embodiment of the invention is illustrated by way of example.

Figure 1:
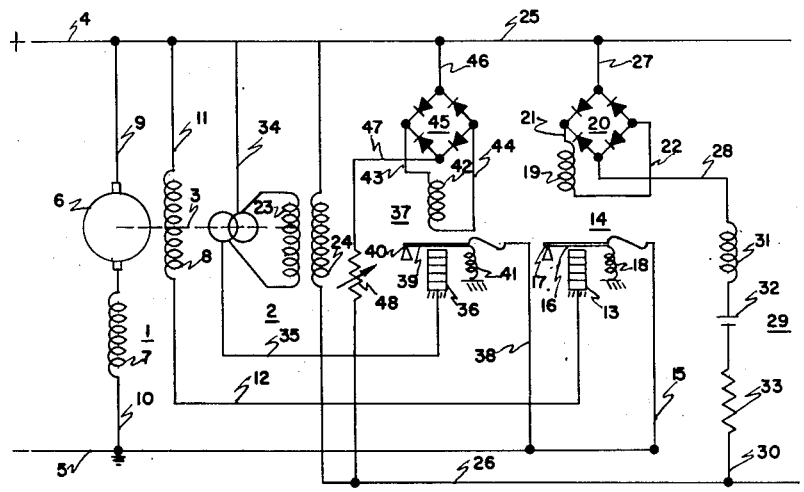
Figure 1 is a schematic diagram of an inverter system embodying the invention.

Reference is now made to Figure 1 of the drawing wherein a motor, indicated generally by the numeral 1, drives a generator 2 by means of a shaft 3. The motor 1 is illustrated as a direct current motor deriving electrical energy from a suitable D. C. source (not shown) through conductors 4 and 5. The motor 1 has an armature 6, series field winding 7 and shunt field winding 8. The armature 6 is connected in series with the winding 7 across the D. C. source by conductors 9 and 10. One end of the winding 8 is connected by a conductor 11 to the input conductor 4, while the opposite end of the winding 8 is connected by a conductor 12 to one end of a variable resistance carbon pile element 13 of a regulator indicated generally by the numeral 14. The opposite end of the carbon pile 13 is connected by a conductor 15 to the conductor 5.

The regulator 14 is illustrated diagrammatically herein as including an armature 16 pivoted at 17 and biased by a spring 18 in a direction for decreasing the resistance of the carbon pile 13. Opposing the spring 18 is an electromagnetic control winding 19. The winding 19 is connected across the output terminals of a rectifier 20 by conductors 21 and 22.

The generator 2, driven by the motor 1 through the shaft 3, is illustrated as having a rotating exciting field winding 23 and a single phase stator winding 24. Output conductors 25 and 26 lead from the stator winding 24 to a suitable load (not shown). It is understood, however, that the generator 2 could be of a type having a stationary field and rotor armature winding, the rotating field type being shown by way of example and not as a limitation. Further, the generator may be multiphase.

One input terminal of the rectifier 20 is connected by a conductor 27 to the output line 25. The other output terminal of the rectifier 20 is connected by a conductor 28, frequency sensing circuit 29, and conductor 30 to the conductor 26. The frequency sensing circuit includes an inductance 31, capacitor 32 and resistance 33 connected in series and proportioned to resonate slightly below the operating frequency.

The exciting winding 23 of the generator 2 has one end connected through conventional slip rings and conductor 34 to the conductor 4, while the opposite end is connected through conventional slip rings and conductor 35 to one end of a variable resistance carbon pile element 36 of a regulator indicated generally by the numeral 37. The other end of the carbon pile 36 is connected by a conductor 38 to the conductor 5.

The regulator 37 is illustrated diagrammatically herein as including an armature 39 pivoted at 40 and biased by a spring 41 in a direction for decreasing the resistance of the carbon pile 36. Opposing the spring 41 is an electromagnetic control winding 42. The winding 42 is connected by conductors 43 and 44 across the output terminals of a rectifier 45.

One input terminal of the rectifier 45 is connected by a conductor 46 to the output line 25. The other output terminal is connected by a conductor 47 to the output line 26. A variable resistance 48 may be inserted in the conductor 47 for adjusting the level of the regulated voltage.

In operation, the output voltage is held within predetermined limits by the action of the voltage regulator. For frequency regulation, the frequency sensing circuit is tuned to a frequency slightly below the operating frequency and proportioned to have a high "Q". Thus small deviations from the operating frequency will result in substantial changes in the energization of the frequency regulator control circuit. In other words, the frequency deviations are amplified. Inasmuch as it is necessary to pass through resonance in order to reach the operating frequency, peak currents and voltages are encountered. The values of these are limited by the provision of the resistor in series with the tuned circuit, thus permitting the use of a high "Q" circuit to provide the desired steep response.

Figure 2:
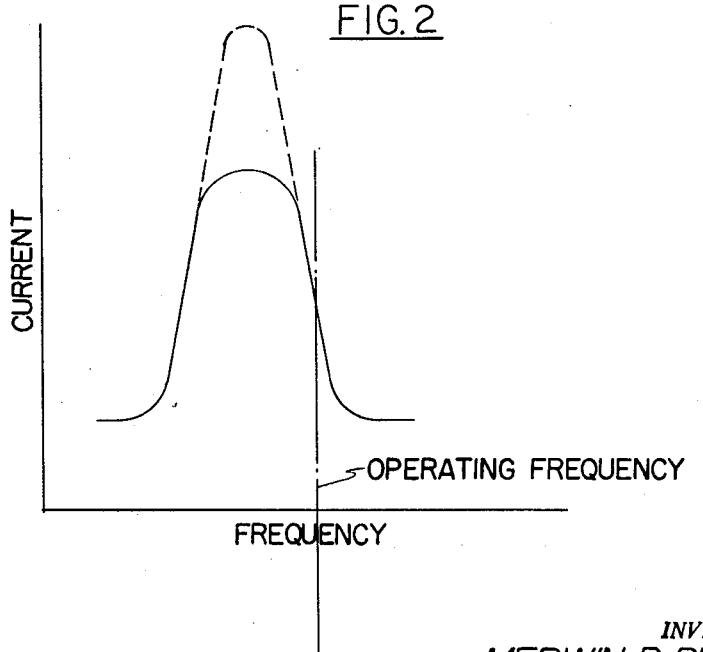
Figure 2 is a graph illustrating the principle of the invention.

Figure 2 illustrates diagrammatically the principle of operation. Without the resistor, the current at resonance would rise to a value indicated by the dashed portion of the curve. With the resistor in series with the tuned circuit, the current will be limited to the value indicated by the solid line portion of the curve. Thus abnormally high currents are prevented without sacrificing sensitivity of regulation.

Although only one embodiment of the invention has been illustrated and described, various changes in the form and relative arrangement of the parts, which will now appear to those skilled in the art, may be made without departing from the scope of the invention.

What is claimed is:

1. A frequency regulator for use with an alternating current generator driven by a direct current motor, comprising a variable resistance element for controlling the energization of said motor, electromagnetic means for actuating said variable resistance element, a series resonant circuit proportioned to have a high "Q" connected for energizing said electromagnetic means in accordance with the output frequency of said generator, and means for limiting the peak values of current in said resonant circuit.

2. A frequency regulating system for use with an alternating current generator driven by a direct current motor having a control winding, comprising a variable resistance element for controlling the energization of said control winding, electromagnetic means for actuating said variable resistance element, and a control circuit for said electromagnetic means responsive to the output frequency of said generator; said control circuit including a rectifier, an inductance, a capacitor and a resistor connected in series circuit relationship across the output of said generator.

3. A regulating system for an alternating current generator driven by a direct current motor, comprising voltage regulating means for maintaining the output voltage of said generator at a predetermined value, a variable resistance element for controlling the energization and thereby the speed of said motor, an electromagnetic winding for actuating said variable resistance element, a rectifier, circuit means connecting said electromagnetic winding across the output of said rectifier, a high "Q" series circuit connecting the input of said rectifier across the output of said generator, and a resistor connected in series with said resonant circuit to limit the peak resonant currents.

4. Frequency regulating means for an inverter having a direct current input and an alternating current output, comprising a direct current winding for controlling the speed of said inverter, a carbon pile resistance element connected to control the energization of said winding, electromagnetic means for actuating said carbon pile element, a rectifier, circuit means connecting said electromagnetic means for energization from the output of said rectifier, a high "Q" series circuit proportioned to resonate at a frequency slightly below a predetermined operating frequency for energizing said rectifier in accordance with the output frequency of said inverter, and means for limiting the peak currents in said resonant circuit.

5. Frequency regulating means for an alternating current generator driven by a direct motor, comprising a carbon pile resistance element connected for controlling the energization and thereby the speed of said motor, an electromagnetic winding for actuating said carbon pile resistance element, means including a high "Q" series resonant circuit tuned to a predetermined frequency below the operating frequency for energizing said electromagnetic winding in accordance with the output frequency of said generator, and means for limiting the peak resonant currents to a predetermined value.

References Cited in the file of this patent

FOREIGN PATENTS 881,237 Germany _____ July 8, 1949